Oct. 3, 1950        O. M. BURKHARDT        2,524,558
SEAL FOR PRESSURE COOKERS
Filed April 11, 1944        3 Sheets-Sheet 1
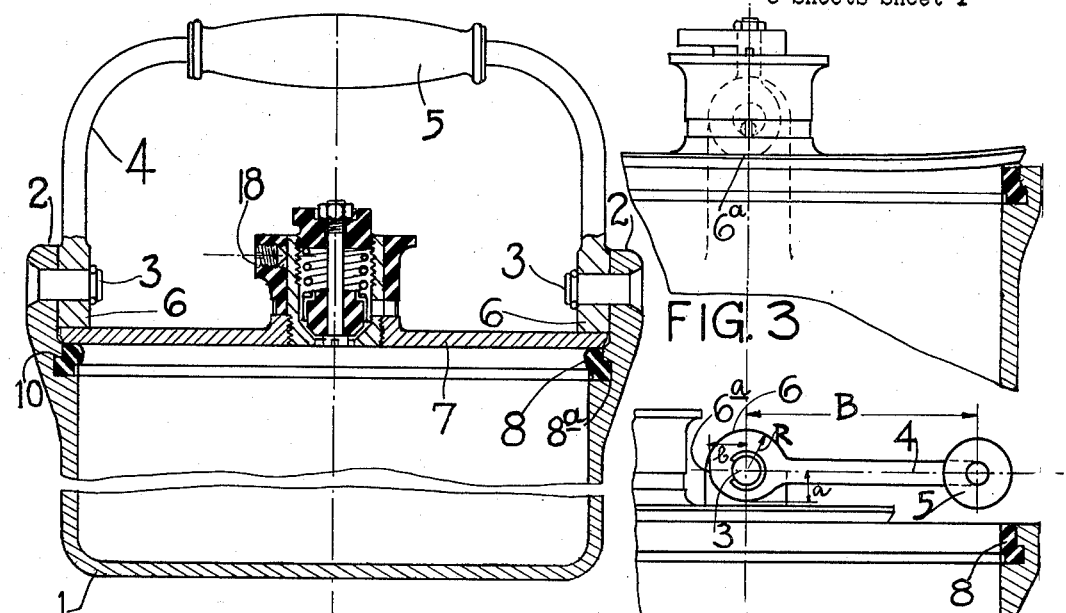
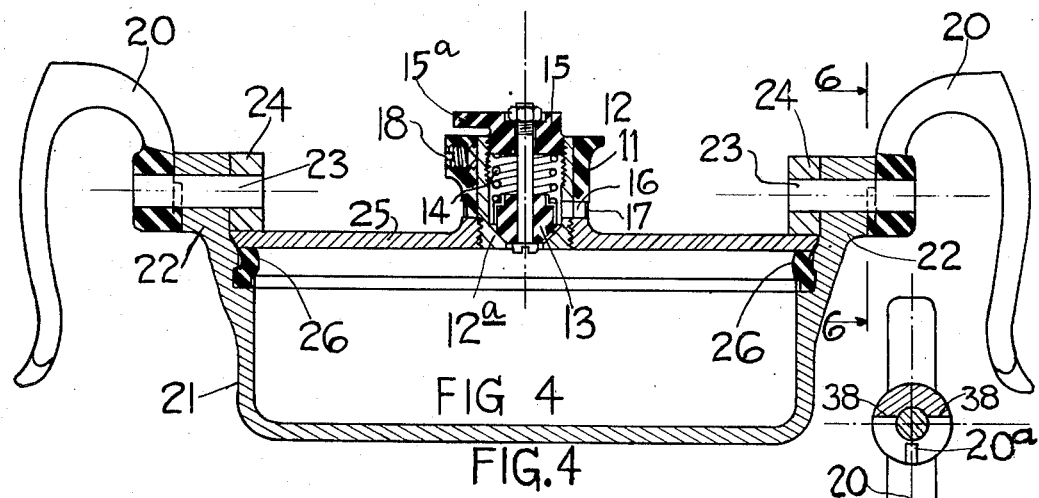
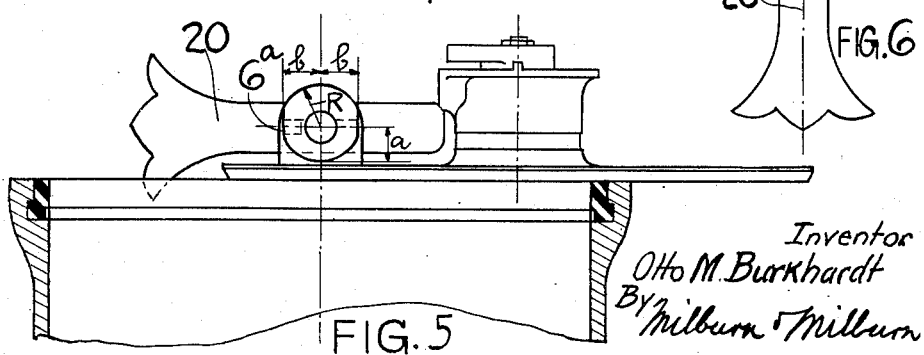
Inventor
Otto M. Burkhardt
By Milburn & Milburn

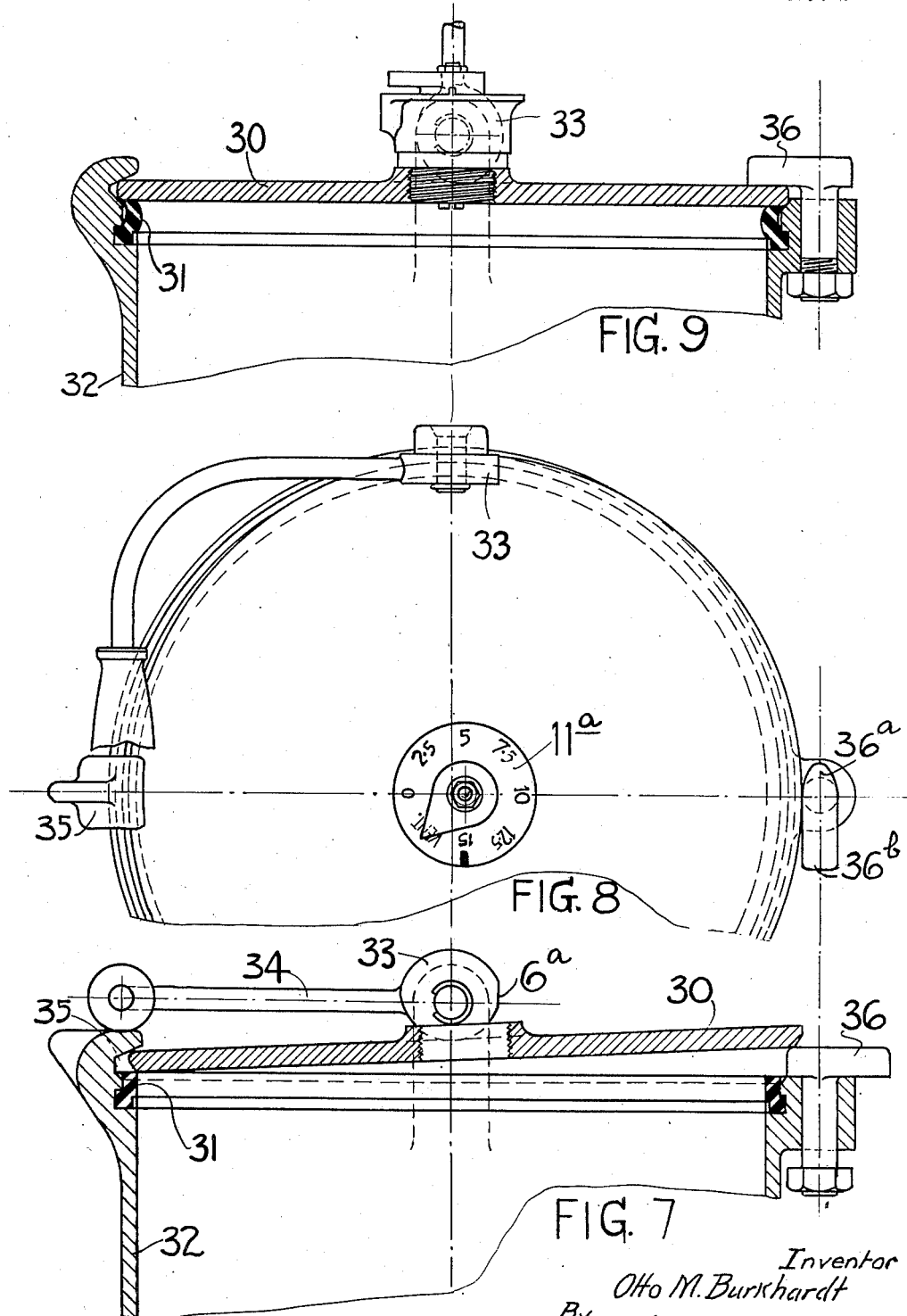

Oct. 3, 1950 — O. M. BURKHARDT — 2,524,558
SEAL FOR PRESSURE COOKERS
Filed April 11, 1944 — 3 Sheets-Sheet 3
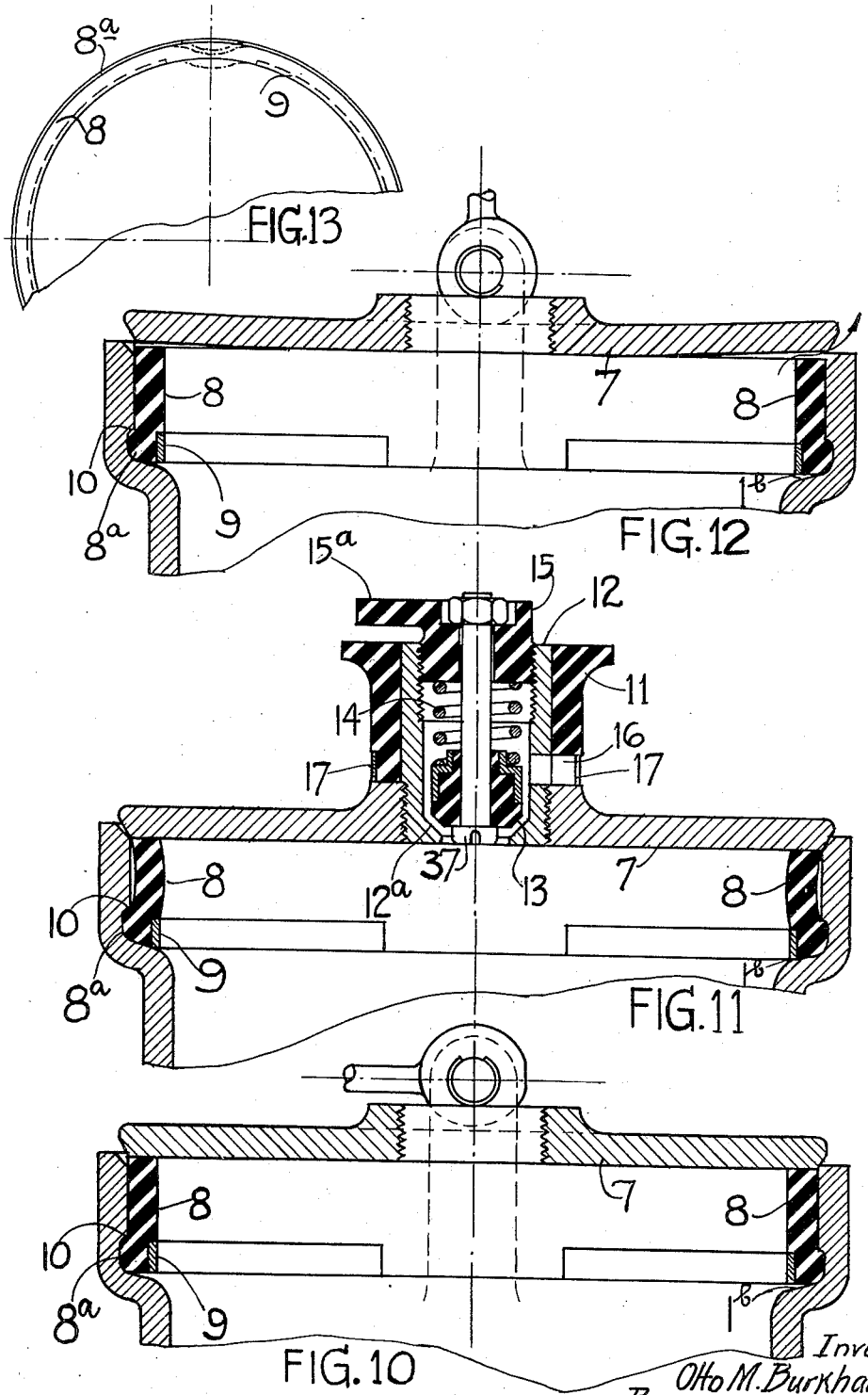
Inventor
Otto M. Burkhardt
By Milburn & Milburn Patented Oct. 3, 1950

2,524,558

UNITED STATES PATENT OFFICE 2,524,558

SEAL FOR PRESSURE COOKERS

Otto M. Burkhardt, Euclid, Ohio

Application April 11, 1944, Serial No. 530,547

2 Claims. (Cl. 220—46)

This invention relates to the art of cooking utensils.

Although my present improved device may be employed for any purpose and in any manner of which it is capable, it is specifically devised to improve the cooking of food by means of steam under suitable pressure within a closed container and it will be described from this particular viewpoint so that its improved features and practical advantages may be fully and clearly understood.

In devising such a cooker, the principal purpose is to conserve the vitamins and flavor of the food and also to reduce the time and heat supply required for the cooking operation. There are also the considerations of convenience and safety, as well as hygienic and sanitary conditions, all of which are satisfied by the use of my present cooker, as will appear from the following.

More specifically, one object of my present invention is to devise an improved manner of mounting, securing and holding the cover upon the container under all conditions.

Another object is to provide such a device with an improved form and arrangement of gasket for sealing the cover in closed position.

Another object consists in providing the cover with a combined form of knob that is adapted to serve as a handle for removing and positioning the cover and also to serve several other very important functions relative to the condition of pressure within the container, as will be more fully explained.

Before entering upon a detailed description of my invention, it might be well to explain briefly that in a general way this device, in all of the several forms herein disclosed, comprises a container; a removable cover and sealing gasket therefor; handle means adapted for lifting the container and also for applying pressure upon the cover and for securing the same in closed position; and a cover knob that, in addition to serving as a means for grasping the cover, embodies also a means for permitting escape of air from the container preparatory to saturating the contents with steam, means for producing an audible signal to indicate a certain condition within the container, means for setting the same for a predetermined pressure, and means for automatically relieving pressure within the container. All of these several features are found in each of the several forms of my present invention although with variations in several respects. For instance, in Figs. 1 to 3 inclusive I have illustrated an arch form of handle upon a smaller size of container; in Figs. 4 to 6 inclusive I have shown another form of handle means which might be employed upon any size of container; and in Figs. 7 to 9 inclusive I have indicated a larger size of container with the arch form of handle and supplemental cover-securing means. In all of the several forms of device herein disclosed, there may be employed the same form and arrangement of sealing gasket; and likewise all of the several forms of my cooker may employ the same form of combined features that are embodied within the knob upon the cover.

All of the several features that are above briefly referred to, are to be understood as constituting objects of my present invention; and other objects will appear from the following description and claims when considered together with the accompanying drawings.

Fig. 1 is a view of a device embodying my present invention with one form of handle in raised or locked position;

Fig. 2 is a view of the same form of device with the handle in lowered or unlocked position.

Fig. 3 is a view of the same form of device and illustrates the upward yielding of the edge of the cover for relief of pressure;

Fig. 4 is a view of a device embodying my present invention with another form of handle means;

Fig. 5 is a view illustrating the manner of removing the cover in the same form of device as is illustrated in Fig. 4;

Fig. 6 is a view taken on line 6—6 of Fig. 4;

Fig. 7 is a view illustrating one step in applying the cover to a larger size of device embodying my invention;

Fig. 8 is a top plan view of the same form of device as is illustrated in Fig. 7 and illustrates the second step in applying the cover;

Fig. 9 is a view illustrating the cover completely locked by the means shown in Figs. 7 and 8, the gasket being bowed inwardly;

Fig. 10 is an enlarged view illustrating the position of the cover and the condition of the gasket prior to locking the cover closed;

Fig. 11 is an enlarged view illustrating the position of the cover and the bowed condition of the sealing gasket when the cover is locked closed;

Fig. 12 is an enlarged view illustrating the upward deflection of the edge portions of the cover in response to excessive internal pressure; and Fig. 13 is a view illustrating the manner of releasing and removing the sealing gasket.

It is to be understood that the present form of disclosure is merely for the purpose of illustration and that there might be devised various modifications thereof without departing from the spirit of my present invention as herein set forth and claimed.

Referring first to Figs. 1, 2 and 3, the container 1 is provided at its upper edge with two oppositely located lugs 2. In these lugs there are fastened two pivots 3 which serve for the mounting of the two ends of the arched handle 4. This handle is preferably provided with a non-metallic handgrip 5 so that it will not become unbearably hot to the bare hand of the user.

The two ends of the handle 4 itself are formed to serve as cams 6, the lobes of which by swinging the handle about the pivots 3, will press hard upon the edge of the cover 7. The cover, in turn, presses upon the gasket 8 of rubber or other resilient material which is so formed that it must yield, in a bow-like form, towards the inside of the container, as indicated in Fig. 1.

The cam lobes 6 are more clearly shown in Fig. 2 where the handle 4 is in horizontal position. It will be noted that the pivots 3 are located eccentrically in the cam disks 6 that form the ends of the handle 4. Since the distance $a$ is less than the distance $b$ from the center of the pivot to the top of the cover, there is clearance for the cover 7 between the cam 6 and the top surface of the annular gasket 8 which is placed upon its more narrow edge in the upper end of the container 1.

With the handle 4 located in horizontal position, as shown in Fig. 2, the cover can be moved horizontally to the right or the left.

If the cover 7 is placed concentrically upon the container 1, it rests primarily upon the top surface of the gasket 8. If then the handle 4 be turned counter-clockwise until it is in vertical position, the cover 7 will be pressed hard upon the top surface of the gasket 8, due to the leverage or the mechanical advantage $B/b$. The gasket 8, being made of resilient material, will yield; and, due to the form and arrangement of the present gasket design, it can yield only in a bow-like manner towards the inside of the container 1 and will assume the condition illustrated in Fig. 1.

If the container 1 be filled with fluid or water-containing vegetables and placed upon a source of heat, pressure will be developed when the contents of the container reach the boiling point; and this pressure will exert itself upon the inner wall of the gasket 8. This of course increases the pressure of the top surface of the gasket 8 against the cover 7 and the sealing becomes more effective as the pressure increases. Obviously the outwardly projecting enlarged lower edge portion 8a of the gasket is forced equally hard beneath a ledge or shoulder 10 provided therefor in the container wall, and this completes the hermetic sealing of the container.

In order to reduce the specific pressure between the cover 7 and the cams 6 which hold it in place, the apex of each cam is flattened, as at 6a, and this feature possesses two advantages. First, it provides an adequate surface area for effective and dependable engagement between the cam and cover and without excessively high local stresses. Second, the flat surface and the pressure of the cover against it provide an arresting or dwell means for the handle in locking position. However, if desired, the handle may be turned to the opposite horizontal position from that shown in Fig. 2. The radius "R" permits this without appreciable further tightening of the cover when the handle is so turned and without loosening of the cover when the handle occupies the position indicated in Fig. 1.

Under the influence of the pressure created in the container, there will be upward deflection of the cover; this deflection, as it most likely will occur in the type of cover and fastening means here shown, is illustrated in Fig. 3. It will be noted that the pressure has straightened out the wall of the gasket 8. The cover has been deflected upwardly and the amount of this deflection is greatest at the points that are farthest away from the regions of engagement between the cover 7 and the cams 6.

It should be noted that there is a definite relation between this upward deflection of the cover 7 and the pressure within the container 1. A definite predetermined pressure is required to straighten out the gasket 8 so that it will permit the formation of a gap between the cover and the gasket; and there is also required a further predetermined pressure to then cause upward deflection of the cover, as shown in Fig. 3 and as more clearly illustrated in Fig. 12. The pressure holds the gasket 8 firmly against the wall of the container 1. The design is such that the pressure which brings about the condition indicated in Figs. 3 and 12 is approximately twenty pounds, which is approximately five pounds higher than the maximum usually recommended for the processing of food. The gasket 8, which is self-sealing for normal pressures, is limited in its upward straightening action and, at a definite predetermined pressure, there will be a deflection of the cover with the result that leakage will occur. This leakage serves as an ideal safety valve as it comes about gradually and the steam, blowing through the small crevice between the edge of the cover and the gasket, gives a definite signal without causing any damage whatsoever. After such leakage occurs and is stopped by reducing the heat applied to the container, the processing may continue until completed.

I will now describe and explain the action of gasket 8 which may be employed in each of the several forms of device herein disclosed, reference now being had to Figs. 10 to 13 inclusive of the drawings in which this particular feature is more clearly illustrated, some of the other parts being omitted from these figures.

The gasket 8 has an outwardly extending enlarged portion 8a about the bottom thereof, which is adapted to engage within a correspondingly formed annular recess and beneath the shoulder 10 in the wall of the container. In free condition the gasket 8 is adapted to rest only partly upon the shoulder 1b provided in the container; and a resilient split ring 9 forces the enlarged portion 8a especially outwardly against that part of the container wall between shoulders 1b and 10. Shoulder 10 prevents the gasket from following the cover in case starchy food should have caused the top edge of the gasket to adhere to the cover.

When closing and sealing pressure is applied to the cover 7, the gasket 8 will be caused to assume the condition indicated in Fig. 11 in which the gasket is bowed inwardly while the lower edge portion thereof and also the split ring 9 are caused to bear more fully against the shoulder 1b. In this condition, the upper edge of the gasket 8 is below the top edge of the container 1; and this condition will continue to exist until pressure develops within the container and deflects the cover 7 in those intermediate portions that are not held to the container by the fastening means. The effect of pressure within the container also will straighten the gasket 8 and, when the pressure is developed to the predetermined point, the gasket will assume the condition indicated in Fig. 12, with its top edge at a higher point than in Fig. 11. It is to be understood that at all times the split ring 9 serves to hold the portion 8a of the gasket in effective sealing engagement in its recess and beneath the shoulder 10; and, since pressure upon the gasket 8 is exerted upwardly as well as outwardly, the tendency of such upward pressure would be to force the gasket bodily upwardly out of the desired sealing position, except for my present provision against this danger. Upon the other hand, the engagement of the portion 8a of the gasket beneath the shoulder 10 will prevent any such accidental upward dislodgement of the gasket by effectively resisting the pressure; in fact, such pressure will serve to ensure effective engagement of the gasket portion 8a within its recess and beneath the shoulder 10 and will thus ensure the anchoring of the gasket in even more secure sealing position.

It should be borne in mind that the resilient split ring 9 helps to ensure initial sealing engagement of the gasket against the wall of the container and thus prevents pressure from developing therebetween.

Up to a point immediately preceding that indicated in Fig. 12, it might be said that the gasket 8, in straightening out due to its own tendency to become free of stress and due also to the pressure upon its inner wall, has followed the upward movement of the cover and consequently has maintained a sealed condition therewith. Or, in other words, the gasket and cover respond together to the increase in steam pressure and, up to this point, the sealing effect of the gasket has continued.

But, when the pressure reaches the point as represented in Fig. 12, there will be further upward deflection of the cover in those regions where it is free to yield, that is between the points of application of the locking means for the cover. Then the cover, in these regions, will leave the gasket 8 and there will occur gaps between the cover and gasket throughout these regions, permitting pressure to escape. Hence the cover hermetically seals the container only to a point of predetermined pressure and, when this is attained, it automatically permits escape of pressure and thus prevents further rise in the pressure and danger of explosion.

The gasket 8 can be removed by inserting a screw driver or other such tool downwardly as far as possible between the gasket and the wall of the container and running this tool around the same until it comes to the point of the gap between the ends of the split ring 9. Then the bottom part of the gasket can be forced inwardly between the ends of the split ring 9, as illustrated in Fig. 13, and thus the tool can be inserted between the container wall and portion 8a of the gasket which is then easily removed.

From the present drawing, it will be noted that the knob 11 which is provided for conveniently handling the cover 7, is utilized also for housing a combination ventilator or vent, signalling device, pressure indicator and safety valve. This combination consists of a sleeve 12, which is screw-threaded into the cover 7 and is provided with a beveled seat 12a internally thereof. Within this sleeve there are located a yielding sealing member 13, a spring 14 and a threaded adjustment means 15. The latter parts are all assembled and held together by a bolt and nut 37; hence these parts may be removed as a unit and cleaned to ensure their continued effectiveness over a long period of time.

The knob 11 is in the form of a non-metallic spool which is attached to the top of the cover 7 and embraces the sleeve 12. This spool 11 serves primarily as a handle for the cover; secondly, its flat extended top surface serves as a dial 11a, as shown in Fig. 8, for the pressure adjustment in conjunction with the adjusting means 15 which is provided with an indicator 15a; and thirdly, an aperture 16 at the lower edge of the spool 11 registers with an aperture in the sleeve 12. Within a recess about the lower edge of the spool there is located a metallic strip 17 which serves as a reed and produces an audible signal when steam escapes in a steady flow through the aperture and past this strip 17.

The operation of this device will now be explained. If food be placed in the container 1 for preparation, it is in many cases advisable to add a small quantity of water. The cover is then placed upon the container in full registering position, in the manner herein explained, and is pressed downward against the gasket 8 by means of the cams 6 which are turned by means of the handle 4. The pointer 15a for the pressure adjustment is placed at the "vent" position to the left of the zero mark upon the dial 11a indicated in Fig. 8. It may be here explained that the indicator 15a can not be brought to "vent" position upon the dial by clockwise movement past the point of fifteen pounds pressure as I have provided a stop point to prevent such improper turning of the indicator 15a. Hence the "vent" position can not be confused with a position for a pressure greater than fifteen pounds but can be reached only by turning the indicator 15a to the left of the zero pressure mark. The combination valve is shown in "vent" position in Figs. 1, 8 and 11.

When the container is placed over a source of heat and the valve is set in "vent" position, vapor will form within the container and will slowly displace the air therewithin by forcing it through the aperture 16 which is in registry with that provided in the sleeve 12. This displacement of the air proceeds very slowly and hence, as it flows past the reed 17, no audible sound is produced. When the boiling point is reached, however, steam is generated at a much faster rate and, the vent being open, it is free to escape past the reed 17. Such increased flow past the reed 17 will produce an audible sound which will serve as a signal for the attendant to set the pressure indicator at the point of desired pressure which, in this case, may be anywhere from zero to fifteen pounds. In setting the pointer 15a to the chosen pressure the threaded member 15 is screwed downwardly, compressing the spring 14 and forcing the sealing member 13 against the seat 12a with a pressure proportional to the amount that member 15 has been turned. When the pressure, for which the pointer 15a has been set, is attained within the container, it will lift the sealing member 13 and escape, whereupon the reed 17 will again cause an audible sound which will increase in intensity as the pressure increases within the container.

In many instances the source of heat may then be eliminated as the contents of the container may either already be sufficiently processed or will be before the pressure drops to zero after turning off the heat under the container. In some cases, however, it may be desired to continue to supply some heat although to a much less extent than was required to bring about the predetermined pressure. When the time required for the processing or cooking operation has elapsed, then the cooker may be left to stand until the food is to be served; or the indicator 15a may be turned to "vent" position, whereupon the steam will escape and thereby reduce the pressure to zero. The sound caused by the reed 17 can be avoided by permitting the steam to escape slowly or by cooling the container by quenching in water.

The pressure within the container 1 is controlled by the compression of spring 14 which presses the sealing element 13 upon its seat. If, after long use, this spring takes a permanent set, then the set screw 18 which fastens the spool 11 to the sleeve 12, should be loosened and water in the container should be brought to boiling point with the cover 7 in place. When steam is emitted freely, then the adjustment means 15 should be turned clockwise to the point at which the steam is stopped from flowing. Then the zero of the dial 11a should be placed so as to coincide with the pointer 15a and a correct zero setting is thus established if the set screw 18 is set in this position of the parts, as explained.

If, through carelessness or lack of experience, the handle 14 is turned to the horizontal position in which the cover 7 can be removed, as in Fig. 2, while pressure exists in the container, then the cover 7 will be lifted by the upward pressure from the gasket 8 an amount b minus a which can be held very small. Even in this position the cams 6 still effectively retain the cover 7 and prevent it from being blown forcibly from position above the container, the cams 6 resisting the free force due to the steam pressure within the container. The cover 7 being removable only in a lateral direction or substantially perpendicular to the axis of the container, this constitutes a safety feature which assures that the cover 7 can not be forced suddenly or violently upwardly off of the container even when, contrary to instructions for the use of this device, the fastening means for the cover 7 are turned into freed condition.

I shall now refer to Figs. 4, 5 and 6 of the drawings in which there is represented the same form of device as is shown in Figs. 1, 2 and 3 with the exception that the handle 4 is replaced by two individual handles 20. In this form of device the container 21 is formed with two lugs which are preferably located opposite each other; and rotatably mounted in these lugs are the pivots 23. Upon the outer end of each pivot 23 there is fastened a handle 20 and upon the inner end of each pivot there is securely fastened the cam 24 for holding the cover 25 to the container. The handles 20 are shown in horizontal position, as in Fig. 5, when the small radius a of the cams occupies position towards the cover 25. In this position a projection 20a on the boss of each of the handles 20, see Fig. 6, comes to bear against an abutment 38 that is provided upon each of the lugs 22 of the container so as to constitute a stop means for the turning movement of the handles 20. The container may be very conveniently handled, however, with the handles 20 in either horizontal or vertical position. When the cover is placed in its proper position upon the container, the handles 20 are turned into vertical position and, with comfortable mechanical advantage, the cams 24 are thereby caused to exert pressure upon the cover and upon the gasket 26. The gasket 26 yields inwardly and assumes the bowed form, as shown in Figs. 4 and 11, and the pressure within the container exerts itself upon the exposed wall of the gasket. Aside from ensuring firm sealing of the cover, this compression also serves to restore the gasket to its normal condition; and, while under the influence of pressure, the cover is deflected upwardly and, at a predetermined pressure above the normal working pressure, the cover is deflected sufficiently so that the gasket is fully restored to its normal condition and leakage develops at the edge of the cover. This serves as a safety measure in case the safety valve should be clogged and fail to function.

In the forms of device shown in Figs. 1 to 6 inclusive, the cover is held in place against the pressure within the container at only two points, which may be the case in the smaller size of cooker.

I will now refer to Figs. 7, 8 and 9 which illustrate a cooker of larger dimensions. In this case the cover 30 is held to the gasket and the container 32 in four places. Two cams 33 are located at the ends of the handle 34, as in Fig. 1; or, if desired, two cams may be actuated by the form of handles illustrated in Figs. 4, 5 and 6; and, since the cover is of relatively large diameter, additional means may be provided for securing the cover closed. One such means, integral with the container, is indicated by reference numeral 35 while the other consists of a latch bolt 36 which serves a double purpose, as will be now explained.

When the cover 30 is to be placed upon the container or is to be removed therefrom, the latch bolt 36 is preferably in the position shown in Fig. 7 while the handle occupies horizontal position as shown. In this position, the cover may be slid between the cams 33 and the container 32 until its extreme edge at the left, as viewed in the drawing, enters the substantially V-shaped slot afforded by the fixed over-hanging member 35. The lower surface of the cover 30 now rests at its extreme left edge upon the gasket 31 while its extreme right edge rests upon the top of the latch bolt 36. When the latch bolt 36 is turned ninety degrees, the cover 30 will drop upon the gasket 31 at the right-hand side of the device, as viewed in Fig. 8. Then the lobe 36a or shorter end portion of the latch bolt 36 may be used to engage the edge of the cover 30 and to force the cover towards the left, as viewed in the drawing, whereby the inclined under-surface of the fixed member 35 forces the extreme left edge of the cover down against the upper edge of the gasket 31. Under the pressure so created, the extreme left portion of the gasket will be forced to yield and to assume the bowed shape illustrated in Fig. 1 and also Figs. 4, 9 and 11. When the cover is in concentric or completely registering position with respect to the container, the handle 34 is turned to vertical position which then applies pressure to the cover and through it over the entire circumference of the gasket 31 and causes it to yield all around in a uniform manner. Then the latch bolt 36 may be again turned ninety degrees so as to bring its longer portion 36b into effective engagement with the top surface of the edge portion of the cover 30 as a means of locking the same in such position, as illustrated in Fig. 9.

Thus I have devised a cooker which possesses numerous practical advantages as will be seen from the present disclosure in its several forms embodied herein. This cooker, when properly used, ensures the processing of food by steam rather than by air; less water and time are required; and heat need be applied for a much shorter time; with the result that the vitamins and natural flavor are conserved, there are eliminated the objectionable odors and froth, and hence the operation is more efficient, economical and sanitary and the food rendered more palatable and nourishing. Also, with my improved cover-sealing and securing means, my means for regulating the pressure within the container, the automatic relief of the same, and the means for producing an audible signal according to the condition within the container, I have produced a device that is thoroughly dependable and highly efficient in its operation and that possesses an outstanding factor of safety.

It is to be understood that either form of handle means as herein illustrated, or even other forms of handle means not here shown, may be employed in combination with the feature which includes elements 35 and 36; and likewise, either form of handle means or other forms of handle means may be employed with the combined knob and vent means. Also, it is possible to employ only one of the handles of Fig. 4 in combination with the feature which includes the elements 35 and 36 or in combination with the combined knob and vent means.

While it is realized that rubber itself is not compressible, in the strict meaning of the word, yet this term is here adopted as a matter of convenience in referring to the deformation of the rubber or rubber-like material of the gasket when pressure is applied thereto upon locking of the cover.

Also, as a matter of convenience in the wording of the claims, it is to be understood that the cover may be regarded as a wall of the container.

What I claim is:

1. A cooking utensil comprising a container with an opening, a closure therefor, a resilient sealing gasket between said closure and container, said gasket being separate and removable from said closure and being of substantially greater height than width so as to provide the same with comparatively narrow upper and lower edge portions, the upper edge of said gasket being normally substantially flush with the edge of said container opening and the inner surface of said gasket being normally substantially flush with the inner surface of said container, the lower edge portion of said gasket being supported by the container wall against downward movement, the body of said closure having engagement with only the top edge portion of said gasket and being confined substantially to a plane thereabove so as to leave the inner side surface of said gasket fully exposed to pressure within the utensil and so as to permit said closure to be positioned upon and removed from said container in a lateral direction, and means located upon said container for securing said closure in closed condition and for compressing said gasket so as to seal said closure upon said container, said securing means being mounted upon said container at diametrically opposite points and extending over said closure so as to prevent complete removal of the same at any time by pressure within the utensil and affording a limited clearance for said closure when in released condition so as to permit relief of pressure within the utensil, the top edge of said container being unobstructed laterally and circumferentially between said securing means so as to permit positioning and removal of said closure in a lateral direction.

2. A cooking utensil comprising a container with an opening, a separate and removable annular resilient sealing gasket surrounding said opening and having its inner surface normally substantially flush with the inner surface of said container, said gasket being of substantially greater height than width and having upper and lower comparatively narrow edge portions, one edge portion thereof being adapted for sealing engagement with said container and being supported by the container wall against downward movement, a closure having its body supported substantially entirely upon the other of said edge portions of said gasket so as to effect sealing engagement between said closure and said gasket and to leave exposed the inner side wall of said gasket to the pressure within the utensil, means of engagement between said closure and container, said means of engagement being capable of occupying one position for completely locked condition of said closure upon said container and a released position to maintain said closure, in released pressure-venting condition, against accidental dislodgement from said container, said closure when in completely locked condition being adapted to produce increased sealing effect of said gasket between the regions of the upper and lower narrow edge portions thereof and said closure and container, respectively, the inner surface of said gasket being free and unobstructed so as to be capable of being deflected inwardly by the force of said locking engagement of said closure thereupon and of being restored towards its original inert condition by the force of the pressure within the utensil.

OTTO M. BURKHARDT.

REFERENCES CITED

The following references are of record in the file of this patent:

UNITED STATES PATENTS

| Number | Name | Date |
| --- | --- | --- |
| 187,768 | Munzinger | Feb. 27, 1877 |
| 243,803 | Scoville | July 5, 1881 |
| 690,828 | Brown | Jan. 7, 1902 |
| 714,376 | Howell | Nov. 25, 1902 |
| 979,813 | Westerbeck | Dec. 27, 1910 |
| 1,312,626 | Grannis | Aug. 12, 1919 |
| 1,735,683 | Hoffmann | Nov. 12, 1929 |
| 1,834,837 | Hashimoto | Dec. 1, 1931 |
| 2,200,903 | Stephens | May 14, 1940 |
| 2,263,653 | Smith et al. | Nov. 25, 1941 |
| 2,357,322 | Glocker | Sept. 5, 1944 |
| 2,372,227 | Sanford | Mar. 27, 1945 |

FOREIGN PATENTS

| Number | Country | Date |
| --- | --- | --- |
| 13,456 | Great Britain | A. D. 1892 |
| 38,086 | Netherlands | Apr. 17, 1936 |
| 178,709 | Great Britain | Apr. 27, 1922 |
| 303,408 | Great Britain | Dec. 28, 1928 |